May 18, 1954  L. B. COURTOT  2,678,834
QUICK-DISCONNECT COUPLING
Filed June 22, 1949

INVENTOR.
LOUIS B. COURTOT
BY Richey & Watts
ATTORNEYS

Patented May 18, 1954

2,678,834

UNITED STATES PATENT OFFICE 2,678,834

QUICK-DISCONNECT COUPLING

Louis B. Courtot, Cleveland, Ohio, assignor to The Weatherhead Company, Cleveland, Ohio, a corporation of Ohio Application June 22, 1949, Serial No. 100,550

9 Claims. (Cl. 284—4)

This invention relates to fluid couplings of the quick-disconnect type; that is, to devices for uniting two fluid conduits which are of such nature that they may be quickly and readily coupled and uncoupled without the use of special apparatus, and which close the ends of the fluid conduits when they are separated. The invention is particularly directed to the solution of a serious problem in quick-disconnect couplings for high pressure systems. In such systems, the fluid pressure forces against the valve elements of the couplings have been so great as to oppose very serious resistance to the coupling operation. The invention, therefore, is particularly directed to a fluid coupling in which the fluid pressures on the movable valve elements of the coupling are substantially balanced, both when the fluid circuit is complete and when it is broken by disconnecting the coupling, so that no great force is required either to couple or uncouple the device. A subsidiary feature of the invention lies in a construction such that no leakage of fluid occurs when the coupling is disconnected and no air is entrapped when it is connected.

Figure 1:
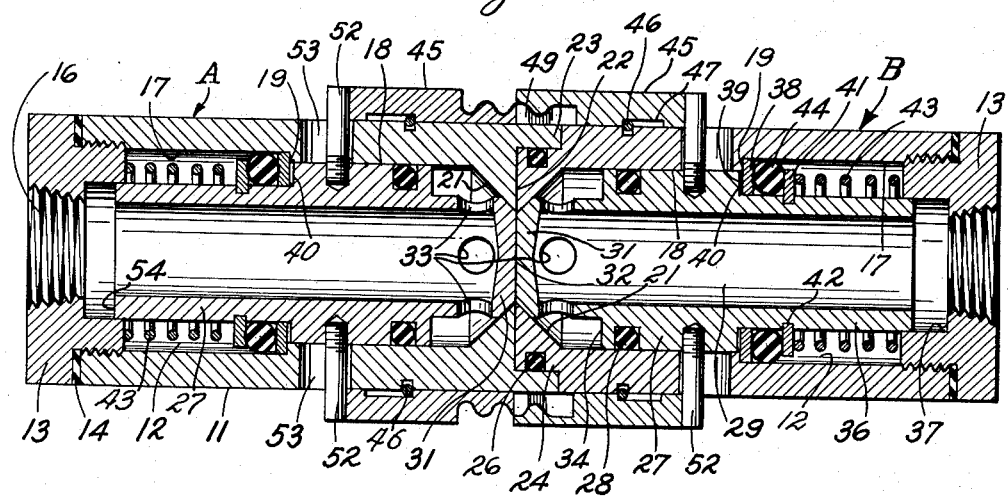
Figure 2:
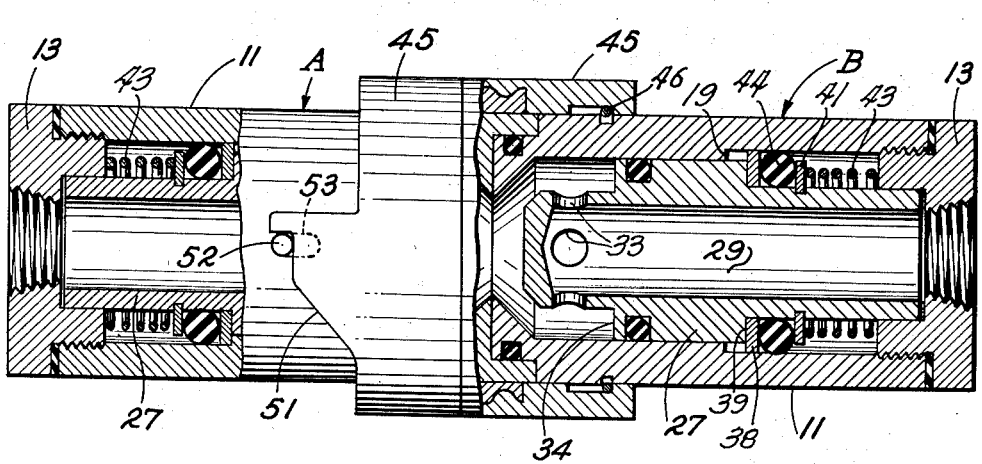

The principles of the invention and the preferred mode conceived by me to carry it into effect will be apparent to those skilled in the art from the appended specification and the accompanying drawings in which:

Fig. 1 is a longitudinal section of a coupling with the two parts in opposition as at the start of the coupling operation; and, Fig. 2 is a view in a plane at 90° to that of Fig. 1 showing the position of parts at the completion of coupling.

The physical structure of the preferred embodiment of the invention will be described with reference to Fig. 1. The coupling comprises two halves or sections indicated as A and B which are substantially alike. Each section comprises a cylindrical body 11 formed with a central through passage 12, the bore constituting the passage 12 being threaded at its outer end for the reception of an end fitting 13 between which and the body is retained a gasket 14. The fitting 13 is tapped as indicated at 16 for the reception of a pipe, a hose end, or the like. The chamber 12 comprises a portion 17 at the outer end adjacent the threads, a portion 18 of less diameter joined to the portion 17 by a radial shoulder 19, and a conical seat portion 21 which opens into the forward face 22 of the fitting. The face 22 of the body A lies within a circumferential flange 23. The forward end portion 24 of the body B is of reduced diameter to fit within the flange 23 and is provided with a circumferential groove for an O-ring seal 26. This difference in the mating faces of the two bodies is the only difference in structure between them.

A valve plunger 27 within each chamber 12 is slidable in the portion 18 of the bore and is fitted with an O-ring seal 28 within a circumferential groove in the plunger. The plunger is formed with a central fluid passage 29 and with a chamfered head or sealing portion 31 which seats against the conical seat 21 of the body, the heads 31 being so proportioned that when seated, their outer faces 32 are substantially in the plane of the face 22 of the body. Each plunger is formed with radial fluid apertures 33 adjacent the face. The forward or valve seat portion of the plunger 27 is of smaller diameter than the central portion which slides in the valve body, these portions being joined by a radial shoulder 34. Likewise, the outer end portion 36 of the plunger is of reduced diameter and is preferably received with clearance for fluid escape in a bore 37 in the end cap 13. A ring or washer 38 is disposed around the portion 36 of the body in position to abut the shoulder 19 of the body and the shoulder 39 of the plunger. A second ring 41 which may be snapped into engagement in a groove 42 in the body serves as an abutment for the spring 43, retained by the cap 13, which urges the plunger 27 toward its seat. A sealing ring 44 is fitted between the rings 38 and 41 and is urged into sealing engagement with the surface of the plunger and the bore by fluid pressure. Since the second ring 41 merely snaps into the groove 42 fluid pressure surrounds the entire ring so that the engagement between the ring 41 and sealing ring 44 does not isolate the fluid from any portion of the rearward side of the ring 41.

Each of the bodies A and B is provided with a coupling sleeve 45 mounted thereon for rotation and for limited movement axially of the body, being retained thereon by a snap ring 46 received in a groove in the body and projecting into a groove 47 of substantial width in the sleeve. The sleeves 45 are formed with interengaging male and female multiple threads 48 and 49 wherein the lead is greater than the pitch so that only a portion of a turn of the sleeves relative to each other is required for full engagement of the thread, or with a bayonet lock arrangement. The outer ends of the sleeves 45 are formed with two helical cam surfaces 51 (Fig. 2) which engage radial pins 52 threaded into the body of the valve plunger. These pins project through slots 53 in the valve bodies which permit limited reciprocation of the pins but no rotation relative to the body.

Fig. 1 shows the coupling members in opposed relation ready for connection and illustrates the valve plungers in the position which then obtains, as well as when the two sections A and B are entirely separated. Fig. 2 illustrates the relation of the parts when the connection has been completed, and, as will be apparent, the valve plungers 27 have been retracted from their seats 21 to permit free flow through the coupling. This retraction is accomplished by the cam surfaces 51 acting upon the pins 52 as the sleeves are interlocked.

As will be apparent, when the valve plungers are in their seated positions as illustrated in Fig. 1, pressure within the system is exerted on the inner face of at least one head 31 tending to move the head axially against the associated tapered seat portion 21. This condition, common to prior devices, results in a pressure load on the plunger which becomes excessive as pressure increases, requiring large manual forces to move one or both plungers to the open position. Such forces are not necessary once the plunger becomes unseated since pressure will then equalize itself across the front and rear faces of the plunger. The present invention overcomes this difficulty.

In the device according to this invention the pressure of the contained fluid is continuously exerted against the annular face or shoulder 34 of the pressure loaded valve member whether the valve is open or closed, and this force acts in a direction opposite that exerted on the head 31 when the valve is closed. When the valve is in the closed position the area of the head 31 subjected to system pressure is equal to, or preferably slightly larger than, the annular area of face 34, sealed by packing ring 28. The pressure in the system is also communicated to the chamber at the rear end of the plunger 27 and is sealed by packing member 44 which transmits its load to the shoulder 19 provided in the body. The clearance 40 is provided between the shoulder 39 on the plunger and the ring 38 when the plunger seats against the valve seat to insure that the force is absorbed by the shoulder 19 on the body. The clearance has been exaggerated in the drawings for the purposes of clarity. Both packings 28 and 44 are open to atmospheric pressure on one side through slot 53. Thus, the only pressure-induced forces on the plunger are the forces on the head 31 in one direction and on the annular shoulder 34 in the opposite direction, these forces being substantially equal. The spring 43, which tends to close the valve, need be only strong enough to overcome the sliding friction of the plunger in the body to urge the valve to the closed position through the connection of washer 41 to the plunger. As will be apparent, when the valve is open, the ring 38 is clear of the shoulder 19 and the entire thrust of the fluid on it is transmitted to the plunger by engagement of the washer 38 with shoulder 39. In this position, the fluid pressure on both sides of the head 31 is the same and its effect cancels out. However, the fluid pressure load on annular area 34 is still present but balanced against the fluid pressure load exerted on the plunger by the washer 38 since the annular area of 38 is equal to the annular area 34. As will be apparent, since the bore 12 is of slightly greater diameter than the bore 18, the projected area of the plunger exposed to fluid pressure tending to close the valve is greater than that exposed to fluid pressure tending to open the valve. Therefore, when the coupling is disconnected, as the sleeves 45 are rotated, the pins 52 follow the cam surface 51 under the urging of spring 43 and the valves are seated. This occurs during the initial stage of the disconnection of the sleeves 45 so that the coupling sections cannot be blown apart by fluid pressure. When the coupling is opened, as previously stated, fluid pressure is no longer effective on the outer faces of the plungers.

The coupling is connected by rotating the sleeves 45 relative to each other which initially engage their mating threads, and upon further rotation bring the high portions of the cams formed on their back end opposite each other so that the pins 52, and hence the plungers, are axially moved away from the mating faces of the coupling. The pins 52, being fastened to the plunger 27, are urged into contact with the cam by spring 43.

In view of the fact that the two faces 22 of the valve members are of mating configuration and the fact that the outer faces 32 of the valve plungers lie in the same plane, substantially no air is admitted to the circuit when the coupling sections are engaged. Since the valve members seat before the sealing ring 26 is out of engagement with the flange 23 when the valve is uncoupled, flow of oil under pressure from the coupling is always prevented.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A self-sealing detachable coupling for fluid pressure lines comprising a pair of separable body members, each member having a forward free end, means spaced rearwardly therefrom for connection to a pressure line, a bore therethrough having forward and rearward cylindrical portions with an abutment therebetween, a flange extending inwardly adjacent a forward zone of said forward cylindrical bore portion formed with an axially rearwardly facing valve seat that is spaced radially inwardly from said forward cylindrical bore portion; a generally tubular valve plunger slidable within both cylindrical portions of said bore, said plunger having means for making sealing engagement with said valve seat and an imperforate wall radially inwardly of said means, an annular shoulder on said plunger, sealing means between said shoulder and forward cylindrical bore portion, said body member and plunger forming a chamber disposed radially outwardly of said valve seat and bounded partially by said plunger forwardly of said sealing means, a port through the wall of said tubular plunger leading from the interior thereof to said chamber, said plunger formed with a groove rearwardly spaced from said shoulder, retaining means positioned in said groove in said plunger, a forward washer and a rearward resilient sealing means between said retaining means and said abutment, said rearward resilient sealing means making resilient sealing engagement with said plunger, said rearward cylindrical bore portion, and the rearward face of said washer, said washer making engagement with said abutment when said plunger engages said valve seat, and a spring engaging said body member and plunger to urge the latter against said seat; means coupling the free ends of said members together into sealing engagement, and means to withdraw said plungers from their respective seats upon coupling of said members.

2. A quick disconnect coupling comprising two parts with mutually engageable faces, each part having connecting means adapted for connection to a fluid pressure conduit, coupling means coupling the parts together with said engageable faces engaging, and a fluid passage formed therein leading from said connecting means to an engageable face and a seat in said part; a valve plunger within said passage, said valve plunger having a sealing portion engageable with said seat in the passage to close the passage, a spring urging the plunger toward the seat, fluid pressure in said fluid passage acting on said sealing portion of the plunger to hold the plunger against the seat, means to withdraw the plunger from the seat whereupon the fluid more nearly surrounds said plunger so the fluid pressure results in forces on said sealing portion of the plunger which are substantially balanced, a flange on the plunger having a projected area approximately equal to the area of said sealing portion exposed to fluid pressure in said fluid passage resulting in forces opposing the seating of said plunger against said seat, an annular piston means normally engaging the flange exposed to fluid pressure resulting in forces tending to urge said sealing portion toward said seat, and means for relieving the plunger of the thrust of the piston means when the sealing portion engages the seat.

3. A quick disconnect coupling comprising two parts with mutually engageable faces, each part having connecting means adapted for connection to a fluid pressure conduit, coupling means coupling the parts together with said engageable faces engaging, a fluid passage formed therein leading from said connecting means to an engageable face and a seat in said part; a valve plunger within said passage, said valve plunger having a sealing portion engageable with said seat in the passage to close the passage, a spring urging the plunger toward the seat, fluid pressure in said fluid passage acting on said sealing portion of the plunger to hold the plunger against the seat, means interconnecting the said coupling means with the plungers arranged so that coupling movement withdraws the plunger from the seat whereupon the fluid more nearly surrounds said plunger so the fluid pressure results in forces on said sealing portion of the plunger which are substantially balanced, a flange on the plunger having a projected area approximately equal to the area of said sealing portion exposed to fluid pressure in said fluid passage resulting in forces opposing the seating of said plunger against said seat, an annular piston means normally engaging the flange exposed to fluid pressure resulting in forces tending to urge said sealing portion toward said seat, and means for relieving the plunger of the thrust of the piston means when the sealing portion engages the seat.

4. A quick disconnect coupling comprising two parts with mutually engageable faces, each part having connecting means adapted for connection to a fluid pressure conduit, coupling means coupling the parts together with said engageable faces engaging, and a fluid passage formed therein leading from said connecting means to an engageable face and a seat in said part; a valve plunger within said passage, said valve plunger having a sealing portion engageable with said seat in the passage to close the passage, a spring urging the plunger toward the seat, said sealing portion having a face isolated from fluid pressure in said passage when engaging said seat and subject to fluid pressure when out of engagement with said seat, ring means encircling the plunger constantly subject to fluid pressure on an area substantially equal to the area of said sealing portion, said ring means being coupled to said plunger to urge the plunger toward the seat, and a stop on said part for engaging said ring means when said sealing portion engages said seat for absorbing the thrust resulting from the fluid pressure.

5. A quick disconnect coupling comprising two parts with mutually engageable faces, each part having connecting means adapted for connection to a fluid pressure conduit, coupling means coupling the parts together with said engageable faces engaging, and a fluid passage formed therein leading from said connecting means to an engageable face and a seat in said part; a valve plunger within said passage, said valve plunger having a sealing portion engageable with said seat in the passage to close the passage, a spring urging the plunger toward the seat, fluid pressure in said fluid passage acting on said sealing portion of the plunger to hold the plunger against the seat, piston means exposed on only one face to fluid pressure in said passage coupled to the plunger to urge the sealing toward the seat, and an abutment on the part located to receive the thrust of the piston means when the plunger engages the seat.

6. A quick disconnect coupling comprising two parts with mutually engageable faces, each part having connecting means adapted for connection to a fluid pressure conduit, coupling means coupling the parts together with said engageable faces engaging, and a fluid passage formed therein leading from said connecting means to an engageable face and a seat in said part; a valve plunger reciprocable within said passage, said valve plunger having a sealing portion engageable with said seat in the passage to close the passage, a spring urging the plunger toward the seat, isolating means for isolating the medial portion of the plunger and a zone of the wall of said passage from fluid under pressure in said passage, said parts formed with openings in said zones, and opening means movable on the exterior of the parts coupled with said plungers through said openings to unseat said sealing portion.

7. A quick disconnect coupling comprising two parts with mutually engageable faces, each part having connecting means adapted for connection to a fluid pressure conduit, coupling means for coupling the parts together with said engageable faces engaging, and a fluid passage formed therein leading from said connecting means to an engageable face and a seat in said part; a valve plunger reciprocable within said passage, said valve plunger having a sealing portion engageable with said seat in the passage to close the passage, a spring urging the plunger toward the seat, isolating means for isolating the medial portion of the plunger and a zone of the wall of said passage from fluid under pressure in said passage, said parts formed with openings in said zones, and opening means on the exterior of the parts coupled with said plungers through said openings to unseat said sealing portion, said opening means being actuated by said coupling means.

8. A quick disconnect coupling part having a fluid conducting passage therethrough, a seat in said passage, a valve plunger in said passage, said valve plunger having a sealing portion engageable with said seat in the passage to close the passage, fluid pressure in said fluid passage acting on said sealing portion of the plunger to hold the plunger against the seat, means to withdraw the plunger from the seat whereupon the fluid more nearly surrounds said plunger so the fluid pressure results in forces on said sealing portion of the plunger which are substantially balanced, a flange on the plunger having a projected area approximately equal to the area of said sealing portion exposed to fluid pressure in said fluid passage resulting in forces opposing the seating forces of the fluid on the sealing portion, an annular piston means normally engaging the flange exposed to fluid pressure resulting in forces tending to urge said sealing portion toward said seat, and means for relieving the plunger of the thrust of the piston means when the sealing portion engages the seat.

9. A quick-disconnect coupling comprising two parts, each part having means adapted for connection to a fluid conduit containing fluid under pressure, coupling means coupling said parts together, a valve seat in each part, plunger means in each part adapted to engage said valve seat, balance means on each plunger exposed to said fluid pressure in said conduit, said fluid pressure on said balance means resulting in a force on said balance means, connecting means transmitting said force to said plunger means when said plunger means is spaced from said seat and means transmitting said force to said part when said plunger means engages said seat.

References Cited in the file of this patent

UNITED STATES PATENTS

| Number | Name | Date |
|---|---|---|
| 451,772 | Redican | May 5, 1891 |
| 2,461,705 | Stranberg | Feb. 15, 1949 |
| 2,505,245 | Hollerith | Apr. 25, 1950 |
| 2,509,444 | Mitchell | May 30, 1950 |

FOREIGN PATENTS

| Number | Country | Date |
|---|---|---|
| 859,331 | France | June 3, 1940 |